UNITED STATES PATENT OFFICE.

WILLIAM W. KNAPP, OF MANSFIELD, MASSACHUSETTS.

IMPROVEMENT IN BRACELETS.

Specification forming part of Letters Patent No. 133,943, dated December 17, 1872.

*To all whom it may concern:*

Be it known that I, WILLIAM W. KNAPP, of Mansfield, in the county of Bristol and State of Massachusetts, have invented certain Improvements in Bracelets, of which the following is a specification:

In the drawing, Figure 1 is a perspective view of a bracelet embodying my invention, and Figs. 2 and 3 are detailed views to illustrate its construction.

My invention consists in the combination of the three parts $a$ and $b\ b$, by making the part $a$ substantially cylindrical, and by forming the edges of the parts $b\ b$ so that they will fit the periphery of the part $a$, and securing them together by a suitable cord or cords passed through holes made in these parts. This cord should be elastic, although in expensive work an inelastic cord may be used, if it be secured to springs which will allow it to yield and keep it under tension. The parts $b\ b$, when made hollow, afford convenient places for these springs.

I prefer to use two cords, although one will answer, especially if it be wide.

It will be obvious that my invention is applicable to all bracelets made up of plates, whatever be the material, and also to the common style of bracelet made of two semicircles, which, as now made, have the ends of the two semicircles held in direct contact by the elastic cord, but which will embody my invention if these ends be grooved and two bars, $a$, inserted between the ends.

I claim as my invention—

The combination of the parts $a$ and $b\ b$, in the manner described, for bracelets, necklaces, and the like.

W. W. KNAPP.

Witnesses:
J. B. SANFORD,
LEVI DERNEN.

W. W. KNAPP.
Bracelets.
No. 133,943.  Patented Dec. 17, 1872.
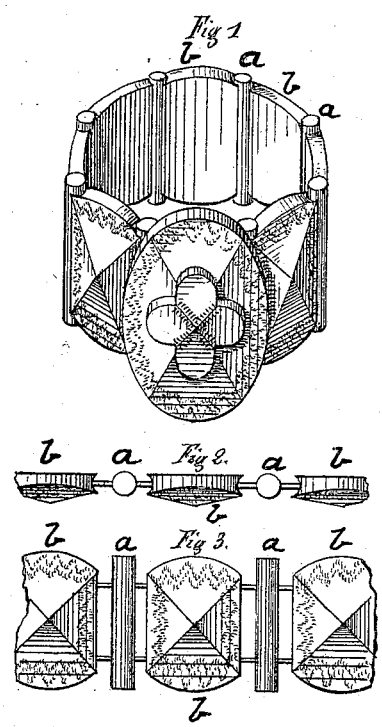
Witnesses
Francis J. Lippott
Henry W. Holland
Inventor
William W. Knapp
by J. E. Maynadier
his atty